United States Patent [19]

Olbrich

[11] Patent Number: 5,021,965
[45] Date of Patent: Jun. 4, 1991

[54] METHOD FOR DIGITALLY STORING A SEWING PATTERN FOR AN INDUSTRIAL SEWING MACHINE AND A DEVICE FOR MANUALLY CORRECTING A STORED SEWING PATTERN

[75] Inventor: Bernd Olbrich, Schwetzingen, Fed. Rep. of Germany

[73] Assignee: Frankl & Kirchner GmbH & Co. KG, Schwetzingen/Baden, Fed. Rep. of Germany

[21] Appl. No.: 263,722

[22] Filed: Oct. 28, 1988

[30] Foreign Application Priority Data

Oct. 31, 1987 [DE] Fed. Rep. of Germany ....... 3737078

[51] Int. Cl.$^5$ .............................................. G06F 15/46
[52] U.S. Cl. .................. 364/470; 112/121.2
[58] Field of Search ................ 364/167.7, 176, 188, 364/191, 192, 469, 470; 112/112.11, 112.12, 272, 457, 458, 80.23; 362/90

[56] References Cited

U.S. PATENT DOCUMENTS

| | | | |
|---|---|---|---|
| 4,526,116 | 7/1985 | Männel | 112/266.1 |
| 4,660,484 | 4/1987 | Yasui | 112/457 |
| 4,742,786 | 5/1988 | Hashimoto et al. | 112/121.12 |
| 4,784,071 | 11/1988 | Sadeh et al. | 112/121.12 |
| 4,821,657 | 4/1989 | Herdeg et al. | 112/121.12 |
| 4,849,902 | 7/1989 | Yokoe et al. | 364/470 |

Primary Examiner—Clark A. Jablon
Assistant Examiner—Paul Gordon
Attorney, Agent, or Firm—Felfe & Lynch

[57] ABSTRACT

A method for digitally sensing and storing a sewing pattern for an industrial sewing machine. To make the sensing process fast and free of error, the invention provides that, starting from a null position of the driving step motors, the fabric carrier is moved under program control in such a fashion that a sewing pattern, disposed on the carrier for the material to be sewn, is scanned 2-dimensionally, the incremental x and y positional data of each step motor always being stored, when the sensor detects a bright-dark contrast on the sewing pattern. Further, for manual input or for making corrections, a device is provided, which is distinguished by a rotary device for setting the desired directional angle of the same pattern. This rotary device can be activated in a direction perpendicular to the rotation-adjustment plane, counter to a reset spring, to initiate a contact.

3 Claims, 2 Drawing Sheets

METHOD FOR DIGITALLY STORING A SEWING PATTERN FOR AN INDUSTRIAL SEWING MACHINE AND A DEVICE FOR MANUALLY CORRECTING A STORED SEWING PATTERN

The invention relates to a method for digitally storing a sewing pattern for an industrial sewing machine with a carrier for the material being sewn, the carrier being driven by at least two step motors, and being movable in the x and y directions according to a stored program, and with a sensor, which responds to bright-dark contrast, and which is disposed at or before the sewing head.

With program-controlled industrial sewing machines, the carrier for the material being sewn is generally driven by step motors in the x and y directions in such a fashion, that the resultant motion follows a prescribed seam path. To drive the step motors appropriately, it is necessary to sense and to store the seam path in digital form, starting from a sewing pattern. The sewing pattern may, for example, be a drawing or a hand-sewn model seam.

To digitize such seam paths, it is known that so-called digitizing pads can be used, and that in this fashion the sewing path can be sensed point by point. Furthermore, the use of other scanning devices can also be considered in principle; these are designated "mouse" or "joystick" for short.

However, DE-PS 19 45 328 and DE-PS 21 21 691, for example, disclose that an optical scanning device can assist in tracing a seam path in order to obtain digitized data. This optical scanning device ensures that positional data are stored in the memory only if the scanning device actually covers the seam when the particular value is polled. This avoids errors during the digitization. T avoid such errors, it is incidentally also already known that a lens may be associated with the scanning device, to make accurate localization above the sewing pattern by the operator possible.

Starting from this, it is an object of the invention to simplify the scanning process, required to digitize a sewing pattern, in such a fashion that an operator no longer is required for the actual scanning process. At the same time, errors associated with scanning process, by an operator are to be avoided.

Pursuant to the invention, this objective is accomplished as follows. Starting out from the null position of the driving step motors, the fabric carrier is moved under program control in such a fashion, that a sewing pattern, disposed on the carrier for the material to be sewn, is scanned 2-dimensionally, preferably in meandering fashion, incremental x and y positional data of each step motor always being stored, when the sensor detects a bright-dark contrast on the sewing pattern.

Pursuant to the invention, a new idea is followed. The program-controlled drive of the carrier for the material being sewn, which is present in any case in an industrial sewing machine, is called upon to operate as a type of program-controlled scanning device. The sewing pattern is scanned in its entirety, without consideration and visual sensing of the seam path. This not only obviates an operator for the actual scanning process, but also eliminates errors due to the operator. The scanning accuracy can be adjusted practically infinitely variably through a pre-selectable scanning program. But in every case, it reaches the accuracy of the drives that are then processing the program, since these drives themselves are used to obtain the position signals. By means of a known, variable sensitivity adjustment of the scanning sensor, it is possible to have the sensor react only to contrast differences due the actual sewing pattern, while brightness changed due to discolorations in the pattern and the like are disregarded. The resulting data can be checked for plausibility by suitable filter programs and modified.

The most simple procedure involves the use of a reflection light barrier as the scanning sensor, such as is already known, in principle, from sewing machine technology for the detection of edges. In principle, it is also possible to work with a transmitted light method.

A further development of the inventive method provides that the displacement between the sensor and the sewing needle is entered manually as a correction value while the digitally sensed, stored sewing pattern is being processed. In each individual case, such manual input can be dispensed with if this displacement remains the same due to the stationary arrangement of the sensor, so that it can be considered as an equipment constant in the program during the processing operation.

In applications, in which the position of the sensor is changed, or when the stored seam path is to be used for processing on a different sewing machine, the displacement between the sewing needle and the sensor is detected automatically in such a fashion that a point-shaped marking is disposed on the carrier for the material being sewn, exactly underneath the sewing needle, preferably when the carrier for the material to be sewn is in its null position. Subsequently, the carrier for the material being sewn is moved under program control until the marking is detected by the sensor. The coordinate data, which is detected in this way, is taken into account as correction data for the processing of the stored seam path.

Thus, by means of the inventive method, a particular seam path can be detected and stored in digitized fashion particularly easily. Through appropriate input equipment, parameters characteristic for a specific seam such as the position of the seam starting point or the geometric center of gravity, which is necessary for coordinate transformations, can be changed while retaining the basic seam picture.

On the other hand, it also appears desirable to change the seam path as such by means of a stored seam picture shown on a display or by interrupting the processing of a stored seam picture.

Accordingly, the invention also relates to a device for the subsequent manual correction of a seam path, which has been sensed and stored according to the inventive method.

Such a device is distinguished by provision of a rotary device for setting the desired, modified directional angle of the seam path. This device can be activated in a direction perpendicular to the rotation-adjustment plane, counter to a reset spring to initiate a contact. Such a rotary device can be designed, for example, as a rotary knob equipped with a finger depression.

Preferably, the rotary device comprises an incremental transducer with an associated sensor to detect an angular position signal. The angular position signal, present at the time that this contact is initiated, is stored by the pressure contact.

For the sake of simplicity, the input means and methods for selecting, inserting, cancelling, changing the scale of, shifting, etc. one or more stitches are not taken into consideration.

In this fashion, it is thus possible to adjust and to store simply and rapidly the appropriately changed directional values for a plurality of positions corresponding to a partially changed seam path. Because of the correspondingly easy handling, not only can individual stitches along a seam path be modified, but even larger regions can be changed with respect to the originally stored sample seam without great effort.

In accordance with the invention, a method for digitally sensing and storing a sewing pattern for an industrial sewing machine with a carrier for the material to be sewn, the carrier being driven by at least two step motors, and being movable in the x and y direction according to a stored program and with a sensor, which responds to a bright-dark contrast and is disposed at or before the sewing head, comprises starting from a null position of the driving step motors, moving the fabric carrier under program control in such a fashion, that a sewing pattern, disposed on the carrier for the material to be sewn, is scanned 2-dimensionally, and storing the incremental x and y positional data of each step motor, when the sensor detects a bright-dark contrast on the sewing pattern.

For a better understanding of the invention, together with other and further objects thereof, reference is made to the following description, taken in connection with the accompanying drawing, and its scope will be pointed out in the appended claims.

Referring to the drawing.

Figure 1:
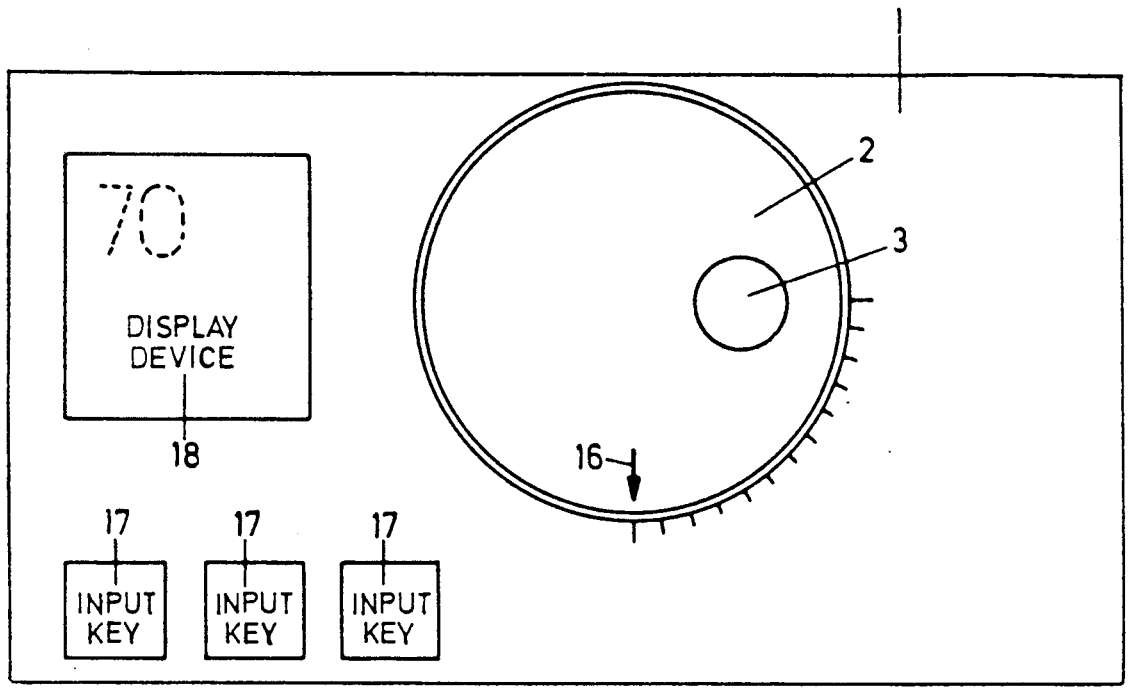
FIG. 1 is a schematic view of an inventive input device.

Referring more particularly to FIG. 1, an input device, shown in the drawing, comprises a housing, of which only the cover plate 1 is shown.

A rotary knob 2 is recessed into the cover plate 1. This rotary knob 2 can be turned by means of a finger depression 3.

Figure 2:
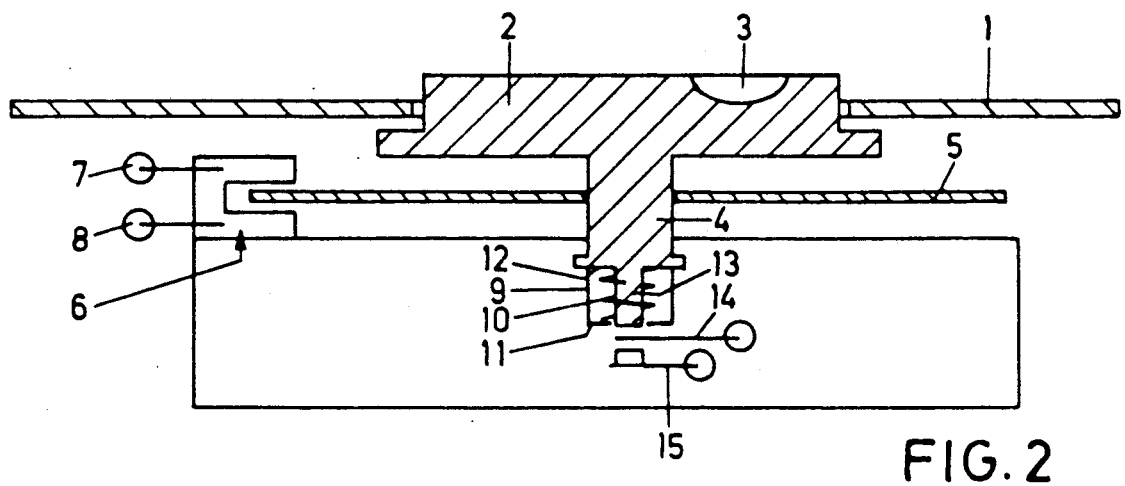
FIG. 2 is a sectional view through an input device of FIG. 1.

Referring to FIG. 2, a cylindrically shaped protrusion 4 is integrally molded to the underside of the rotary knob 2. An incremental transducer disk 5 is fastened to the protrusion 4. It engages, for example, an optical sensor 6 with electrical connections 7, 8. Such an incremental transducer is designed in well-known fashion, for example, as a slotted disk with an associated transmitted light barrier, as a disk with differently reflecting radial lines and a reflection light barrier, or the like. A helical spring 10 is disposed in a housing section 9. This helical spring is supported on the bottom 11 of the housing section 9 on the one hand and at the bottom 12 of the protrusion 4 of the rotary knob 2 on the other hand.

A constricted section 13 of the protrusion 4 penetrates the helical spring 10 and a hole in the floor 11 of the housing section 9, underneath which are disposed a spring contact 14 and a counter contact 15. By pressing on the rotary knob 2 against the reset force of the spring 10, the contacts 14 and 15 are caused to close and, after the rotary knob is released, are opened again.

As is clear especially from FIG. 1, the rotary knob 2 makes it possible to set a particular direction corresponding to the direction in the sewing pattern, in which a particular stitch is to be executed. This is done in conjunction with an arrow-like directional marking 16 at the rotary knob 2 itself and directional markings at upper side of the covering 1 at the periphery of the rotary knob 2. After the desired direction is set by means of the rotary knob 2 or the marking 16, this direction can be entered (acknowledged) by pressing the rotary knob 2 over the pair of contacts 14, 15, which are activated thereby.

FIG. 1 furthermore shows that the covering 1 of the housing can have a display device 18 and a plurality of input keys 17.

The display device 18 can display, for example, the number of the particular seam picture, the particular stitch length, the type or number of a stitch that is just then being programmed, and the associated angular data.

Figure 3:
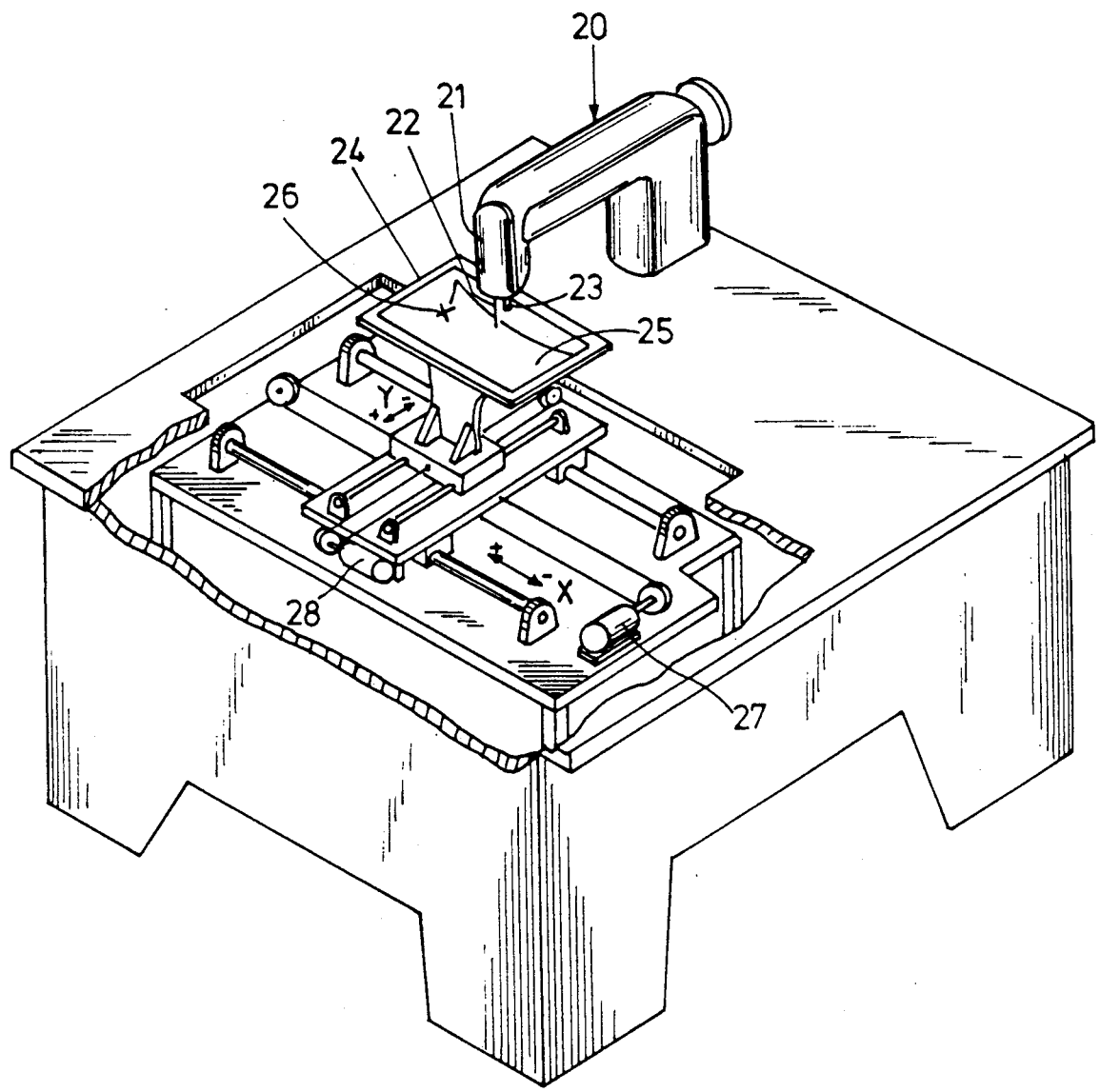
FIG. 3 is a perspective view of a sewing machine for use with the method of the present invention.

Through the keys 17, one can select the operating mode, one can insert and delete stitches, one can reduce or enlarge, one can read or write data from/to mass memories, etc. FIG. 3 represents a sewing machine 20 having a sewing head 21 with a needle 22 and a sensor 23. A fabric carrier 24 supports a fabric or sample 25 having a point marking 26. Step motors 27, 28 move the carrier in the x and y directions according to a stored program.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for digitally sensing and storing a sewing pattern for the sewing of same on a sewing machine;
    said sewing machine being operable such that a material to be sewn can be placed on a carrier, said carrier being driven by at least two step motors, and being movable in the x and y directions;
    the method comprising:
    a. using a scanning device which responds to bright-dark contrast and is disposed at or before the sewing head;
    b. placing on the carrier a sewing pattern sample corresponding to that to be sewn on the material;
    c. displacing the carrier, starting from a null position of its drivable step motors, line by line in x or y direction in such a way that the whole sewing pattern sample is scanned; and
    d. storing the incremental position data of the step motor working in x and y direction whenever the scanning device detects a bright-dark contrast on the sewing pattern sample corresponding to said sewing pattern to be sewn under program control by said sewing machine.

2. The method of claim 1, comprising entering manually the displacement between the scanning device and the sewing needle as a correction value, while the digitally sensed and stored sewing pattern is being processed.

3. The method of claim 1, wherein the scanning 1-dimensionally comprises detecting automatically the displacement between the sewing needle and the scanning device in such a fashion that a point-shaped marking is disposed on the carrier for the material being sewn, exactly underneath the sewing needle, when the carrier for the material being sewn is in its null position, and wherein moving the carrier comprises subsequently moving the carrier for the material to be sewn under program control until detecting the marking by the sensor, and utilizing the coordinate date, which is detected in this way, as correction data for the processing of a stored sewing pattern.

* * * * *

UNITED STATES PATENT AND TRADEMARK OFFICE
CERTIFICATE OF CORRECTION

PATENT NO.   : 5,021,965
DATED        : June 4, 1991
INVENTOR(S)  : Bernd Olbrich It is certified that error appears in the above-identified patent and that said Letters Patent is hereby corrected as shown below:

Column 1, line 37 for "T avoid" read -- To avoid --.

Signed and Sealed this

Sixteenth Day of August, 1994

*Attest:*

BRUCE LEHMAN

*Attesting Officer*     *Commissioner of Patents and Trademarks*